United States Patent

Wagener et al.

[11] Patent Number: 6,152,479
[45] Date of Patent: Nov. 28, 2000

[54] HOUSING FOR THE AIR BAG IN A MOTOR VEHICLE

[75] Inventors: Keit Wagener, Bissendorf; Guido Stölting, Steinfeld; Jürgen Klenk, Ginsheim; Ulrich Rick, Roxheim, all of Germany

[73] Assignee: Lemförder Metallwaren AG, Germany

[21] Appl. No.: 09/016,491

[22] Filed: Jan. 30, 1998

[30] Foreign Application Priority Data

Feb. 1, 1997 [DE] Germany .................... 197 03 787

[51] Int. Cl.$^7$ ................................. B60R 21/16
[52] U.S. Cl. ........................ 280/728.2; 280/732
[58] Field of Search ................. 280/728.1, 728.2, 280/730.1, 730.2, 732

[56] References Cited

U.S. PATENT DOCUMENTS

| | | | |
|---|---|---|---|
| 5,277,442 | 1/1994 | Cuevas | 280/731 |
| 5,470,097 | 11/1995 | Elqadash et al. | 280/728.3 |
| 5,639,112 | 6/1997 | Phillion et al. | 280/728.2 |
| 5,816,607 | 10/1998 | Bugdaci et al. | 280/728.2 |

FOREIGN PATENT DOCUMENTS 41 41 617 A1  7/1992  Germany .
43 38 666 A1  5/1995  Germany .

OTHER PUBLICATIONS

Klenk et al. 1996 "Airbag–Hybridtechnik im neuen Opel Vectra" *ATZ Automobiltechnische Zeitschrift* .

*Primary Examiner*—Daniel G. DePumpo
*Assistant Examiner*—Christopher Bottorff
*Attorney, Agent, or Firm*—McGlew and Tuttle, P.C.

[57] ABSTRACT

A housing for an inflatable air bag in a motor vehicle with a diffusor section capable of receiving a gas generator, a shot channel section receiving the airbag, and fastening brackets. A plurality of reinforcing ribs have a shape and are positioned on the shot channel section for counteracting expansion of the shot channel section at an outer contour. The diffusor section, the shot channel section, the fastening section and the plurality of reinforcing ribs are formed in one piece and with a plurality of walls. An edge of the shot channel section is multiwalled and all the parts of the housing are homogeneously connected to each other.

17 Claims, 6 Drawing Sheets

HOUSING FOR THE AIR BAG IN A MOTOR VEHICLE

FIELD OF THE INVENTION

The present invention pertains to an inflatable air bag in a motor vehicle with fastening brackets made in one piece with the housing and having a diffusor with an inserted gas generator.

BACKGROUND OF THE INVENTION

Inflatable air bags have been increasingly used in modern automobiles. Together with an inflating means, the air bag is accommodated in a housing. The inflating means is also called a gas generator. The system is ignited via sensors. Extremely strong forces, which widen the housing to the outside in the manner of the mouth of a fish, are partially generated in the area of the outlet of the air bag immediately after the ignition of the gas generator. The greatest expansion takes place approximately in the middle of the area of the free opening of the front chamber. The outlet-side area of this front chamber is also called the shot channel. The fish mouth-like expansion of the shot channel may lead to damage to the surrounding components, which may lead, e.g., in the case of the air bag installed on the passenger side, to the deformation of the entire dashboard and to the need to replace it. This entails costs, which are avoidable.

A great variety of variants of housing designs for inflatable air bags, which are to avoid the fish mouth effect, have been known.

For example, a vehicle air bag module, in which a folded air bag and an inflating means are accommodated together in a housing and are installed in the vehicle as a complete assembly unit, is disclosed in DE-41 41 617 A1. In the solution described in that document, the housing has two compartments: a front compartment and a rear compartment. An inflating means is inserted into the rear compartment. This comprises a cylindrical outer housing, in which a plurality of nozzles are provided. The cylindrical outer housing is called the diffusor. The diffusor is used to accommodated the gas generator. The holes of the diffusor are arranged in the housing of the air bag unit such that a directed discharge of the gas into the air bag can take place. Without a diffusor, the gas would spread out non-uniformly after the gas generator has ignited. However, this would not be desirable, because the air bag must be inflated within fractions of one second reliably, dependably and uniformly in order to function as intended.

The diffusor with the gas generator inserted therein is introduced into a hole in one side wall of the housing and screwed to the opposite housing wall by means of a threaded shaft.

The air bag itself is inserted into a reinforced frame, which is fitted into the housing.

The entire housing construction is composed of a plurality of individual parts in the embodiment shown. The housing is made as a sheet metal part. Besides the fact that manufacture is expensive due to manufacturing reasons, such a housing has the drawback of having a high intrinsic weight.

To compensate these drawbacks, it is proposed in DE 43 38 666 A1 that a housing for an air bag be made of plastic. Plastics make it possible to considerably reduce the weight compared with metallic materials. In addition, the brackets for fastening the housing in the motor vehicle are made in one piece with the plastic housing in the solution shown in this document.

SUMMARY AND OBJECTS OF THE INVENTION

The primary technical object of the present invention is to develop a housing for the inflatable air bag in a motor vehicle, which can be manufactured in a simpler manner and at a lower cost than prior-art designs and which counteracts the expansion of the shot channel during the inflation of the air bag.

This object is accomplished with a one-piece, multiwalled, multifunctional housing provided with the reinforcing ribs counteracting expansion of the shot channel at the outer contour. The housing has a diffusor section and a shot channel section. The plurality of ribs have a shape, and are positioned on the shot channel section, for counteracting expansion of the shot channel section. The diffusor section, the shot channel section, the fastening section and the plurality of reinforcing ribs are formed in one piece, with an edge of the shot channel section being preferably multiwalled. All the parts of the housing are preferably homogeneous and are homogeneously connected to each other.

The housing according to the present invention may comprise one or more chambers, with one front chamber being preferably used to accommodate the folded air bag or air bag module and a rear chamber being preferably used to install the said gas generator. The gas generator is inserted into a diffusor. The rear chamber may be designed as a diffusor chamber or it may accommodate the diffusor as a separate component.

In addition, reinforcing ribs intended to come into contact with the folded air bag may be provided between the diffusor chamber and the front chamber. The reinforcing ribs connect the upper side and the underside of the front chamber, they additionally stabilize the housing from the inside, on the one hand, and, on the other hand, they guarantee a distance between the air bag module and the rear chamber of the housing. The gas passage openings are located between the reinforcing ribs.

A housing according to the present invention for an inflatable air bag in a motor vehicle is multifunctional, because it assumes a plurality of functions at the same time. Thus, fastening brackets, which are needed for mounting the housing into the motor vehicle, are made directly in one piece with the one-piece housing in the known manner. In addition, it is advantageous to make plug-type fastenings, cable clips or additional components in one piece with the housing if the latter is made, e.g., as a plastic molding according to the injection molding process. The expensive manufacture and mounting of numerous individual components is thus reduced to a minimum. The injection molding process makes possible a relatively simple and above all inexpensive manufacture of a housing according to the present invention as a mass-produced article. In addition, plastic as a material proves to be a suitable material, which it is easy to process and makes it possible to greatly reduce the weight compared with designs made of metal.

If plastic is used, it is, in addition, possible to reinforce it in a simple manner by adding additives, e.g., glass fiber materials. It is, of course, also possible to add other materials to the plastic. A reinforcement consisting of metals or a combination of different plastics is also conceivable. The selection of the plastic also plays a decisive role. Modified polyamides have proved to be advantageous.

However, the housing may, of course, also be made of aluminum, manufactured according to the aluminum diecast method.

To meet the high requirements imposed on the strength of a housing according to the present invention for accommodating an air bag in a motor vehicle, it is advantageous to design the front chamber for accommodating the air bag module as a multiwalled chamber.

Webs, which form supporting frameworks in a parallel arrangement, triangular arrangement in a similar manner, are preferably used as connections for the individual walls, similarly to a bridge construction. Thus, a considerably greater stability can be achieved compared with prior-art housing designs.

A multiwalled design is especially efficient if two or more parallel chamber cavities separated from one another form the outer wall of the front chamber for accommodating the air bag module. A type of sandwich design is thus formed. At least the shot channel of the front chamber should have a multiwalled design according to the present invention, because it is exposed to the greatest loads during the inflation of the air bag.

In addition, the housing according to the present invention offers a considerable advantage in terms of stability if the front chamber accommodating the air bag module, but at least the shot channel, expands uniformly toward the outlet side of the air bag, i.e., if it is designed with a V-shaped cross section. Such a design makes possible an improved expansion of the air bag during the inflation process.

In addition, an improvement in the rigidity of the housing can be achieved by additionally providing the chamber wall accommodating the air bag with reinforcing ribs on its outer, free surface. These reinforcing ribs are effective if they expand, beginning from the weakest point of the chamber wall, e.g., in a star-shaped, V-shaped, radial segment-like, box-shaped or arc-shaped pattern. Honeycomb structures have also proved to be suitable. Combinations of the above-described arrangements of the reinforcing ribs may be made as desired.

The weakest point of the chamber wall is located on the front side of the shot channel, because the chamber wall has to travel over the greatest path at that point. In the case of structuring and at the same time multiwalled design of the chamber wall, the wall thickness can even be reduced compared with prior-art designs, while the strength is improved, so that a housing of an inflatable air bag according to the present invention can be manufactured from less material and thus with a reduced weight.

The better possibility of adaptation to the area of mounting and a resulting simplification of mounting are advantageous in a housing according to the present invention for an inflatable air bag in a motor vehicle. The minimization of the weight makes possible manufacture at lower cost as a consequence of the possibility of saving material, while the strength is improved at the same time, without having to accept limitations in safety.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
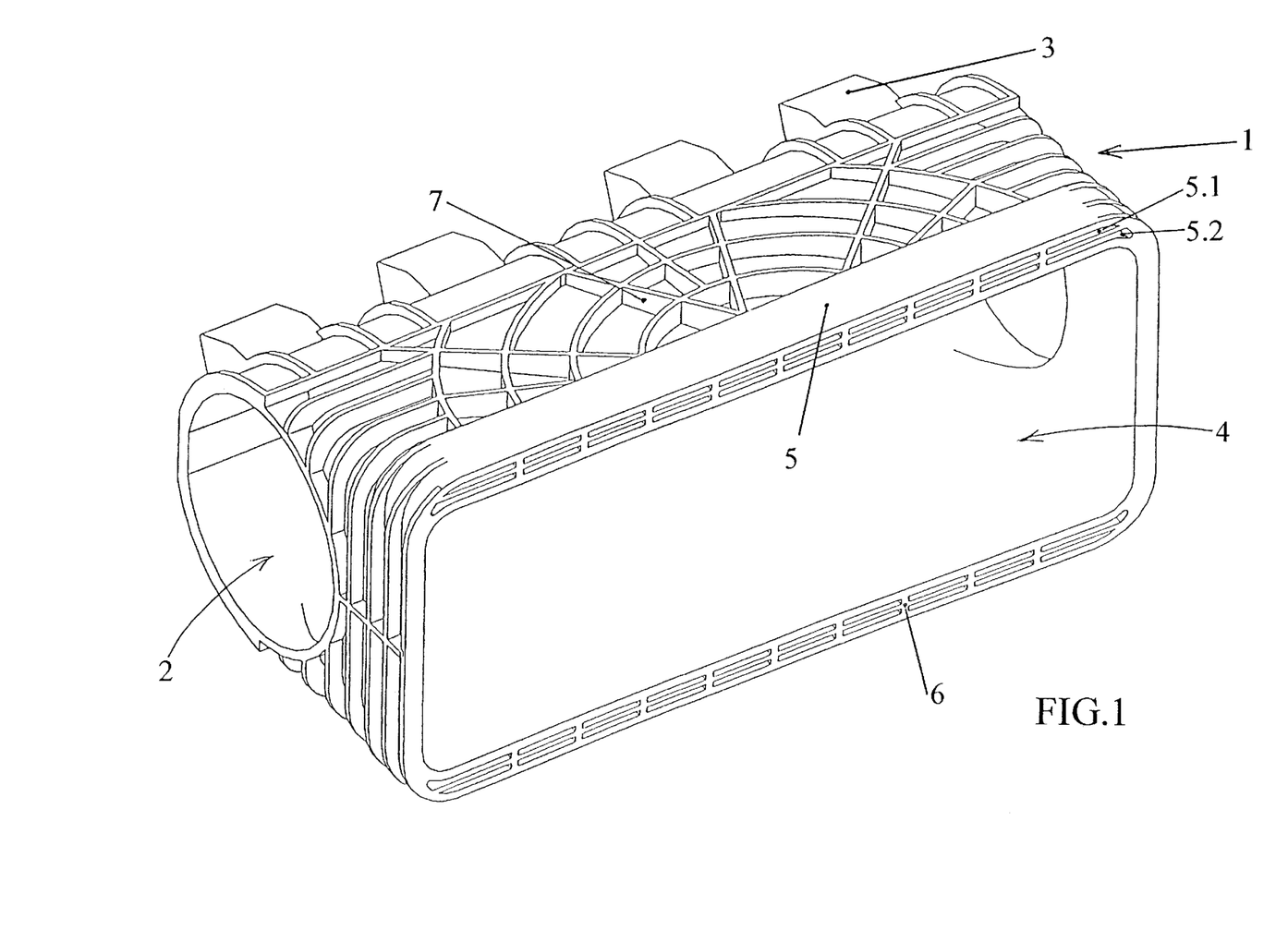
FIG. 1 is a three-dimensional representation of a housing according to the present invention for an inflatable air bag in a motor vehicle.

Referring to the drawings, and in particular to FIG. 1, a three-dimensional representation of a housing 1 is provided according to the present invention for an inflatable air bag in a motor vehicle. Such a housing 1 is made in one piece together with the brackets 3 made integrally in one piece with it. It consists of a plastic and is manufactured according to the injection molding process.

The housing, comprising two chamber areas, has a front chamber 4 for accommodating the folded air bag or air bag module, and a diffusor chamber 2 for mounting the diffusor and the gas generator. The two chamber areas together form the interior space of the housing 1. The outlet area of the front chamber 4 is also called the shot channel.

To meet the high requirements imposed on the strength of a housing 1 according to the present invention for accommodating an air bag in a motor vehicle, the shot channel is designed as a multiwalled channel.

A multiwalled design is especially efficient if, as is shown here, more than two parallel chamber cavities 5.1 and 5.2, which are separated from one another, form the outer wall 5 of the front chamber 4 in a sandwich design. Similarly to a bridge construction, the multiwalled outer wall has transverse reinforcing shot channel ribs 6, which thus form supporting frameworks in a parallel arrangement. The present housing consists of a modified polyamide and is additionally reinforced with glass fibers to increase its strength.

An improvement in the rigidity of the housing can also be achieved, besides by the multiwalled design of the chamber wall, especially by the outer wall accommodating the air bag being additionally provided with reinforcing outer wall ribs 7 on its outer, free surface. These reinforcing ribs 7 are effective only if they expand beginning from the weakest point of the chamber wall 5. The weakest point of the chamber wall 5 is located on the front side of the shot channel 4 exactly in the middle, because the chamber wall 5 can travel the greatest free path at this point.

In the embodiment shown in FIG. 1, the reinforcing ribs 7 expand in a V-shaped pattern and are combined with arc-shaped reinforcing ribs.

In the case of structuring and at the same time multiwalled design of the chamber wall 5, the wall thickness can even be reduced compared with prior-art designs, while the strength is improved, so that a housing according to the present invention for an inflatable air bag can be manufactured from less material than in the case of prior-art designs and thus it can have a lower weight.

Figure 2:
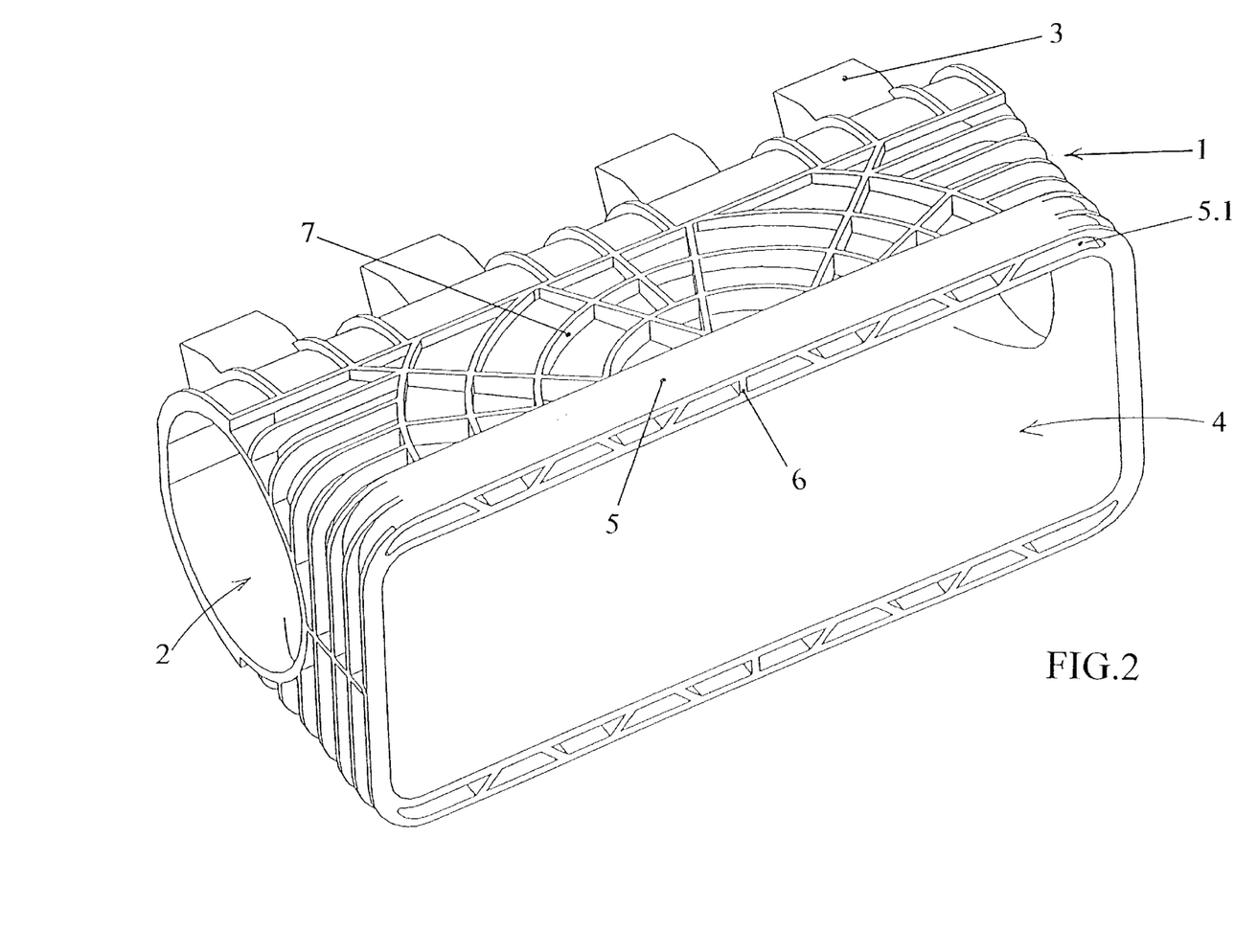
FIG. 2 is a three-dimensional representation of another housing according to the present invention for an inflatable air bag in a motor vehicle.

FIG. 2 likewise shows a three-dimensional representation of another housing according to the present invention for an inflatable air bag in a motor vehicle. Compared with the variant shown in FIG. 1, the shot channel of the front chamber 4 for accommodating the air bag module likewise has a multiwalled design in this variant of the housing. However, the chamber cavities 5.11 comprises recesses having a trapezoidal front view here, so that a stable supporting structure with transverse reinforcing ribs 6 is obtained, on the whole.

Figure 3:
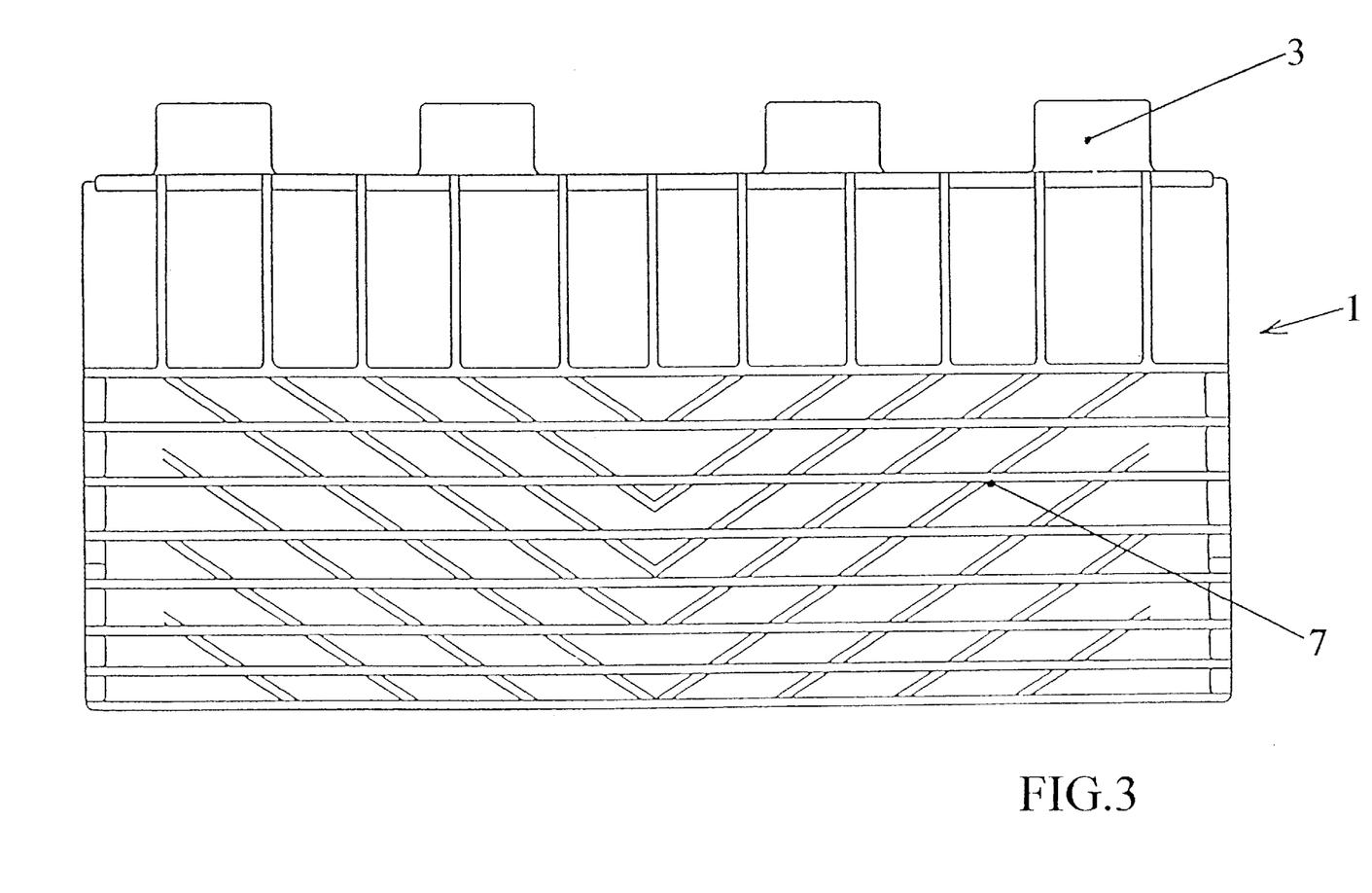
FIG. 3 is a possible ribbing of a housing according to the present invention.

Moreover, FIG. 3 shows an additional variant of a ribbing of the free outer surface of the chamber wall 5. The reinforcing ribs 7 are designed as combinations of V-shaped ribs extending vertically between the walls.

Figure 4:
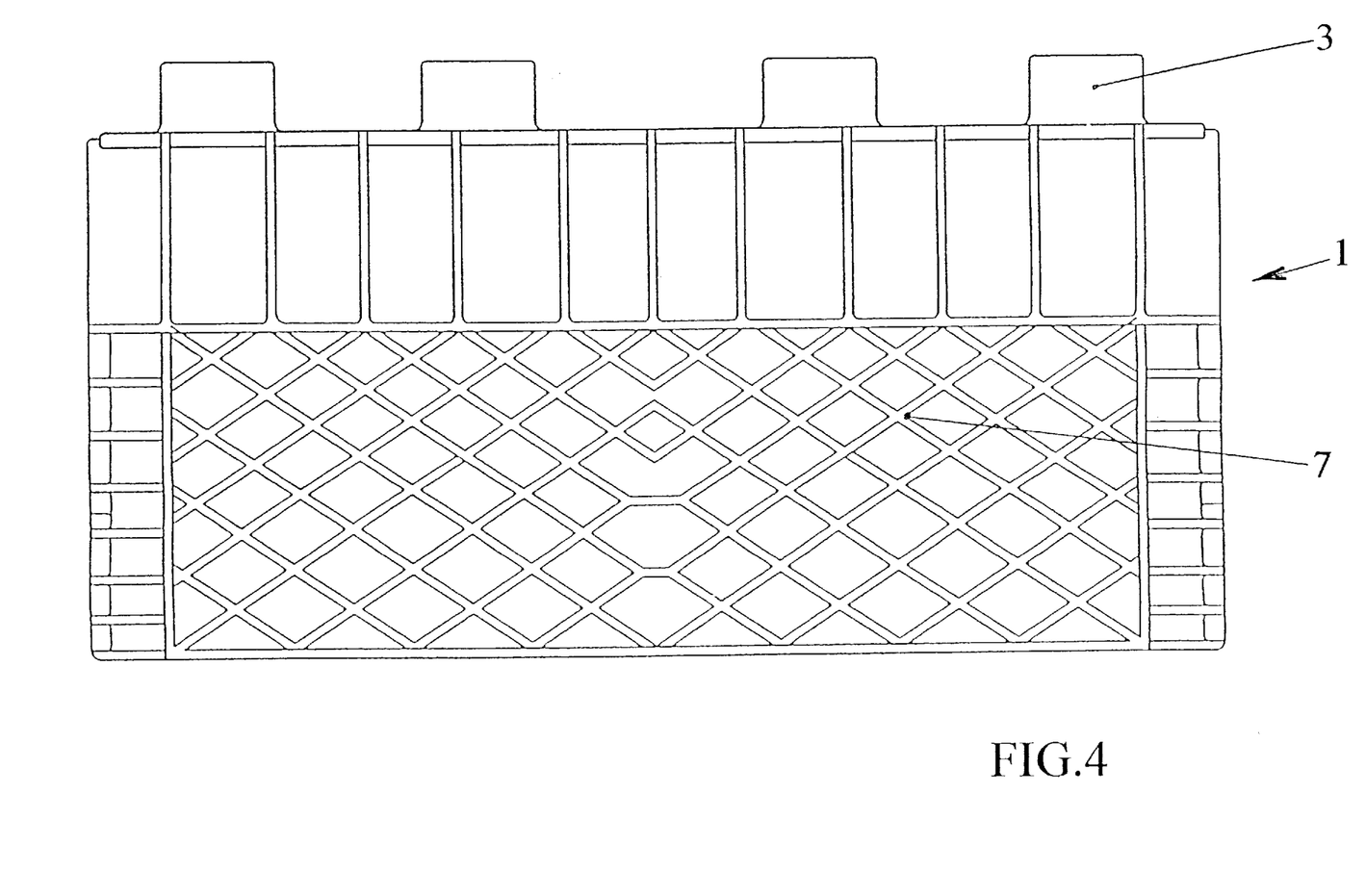
FIG. 4 is another ribbing of a housing according to the present invention.
Figure 5:
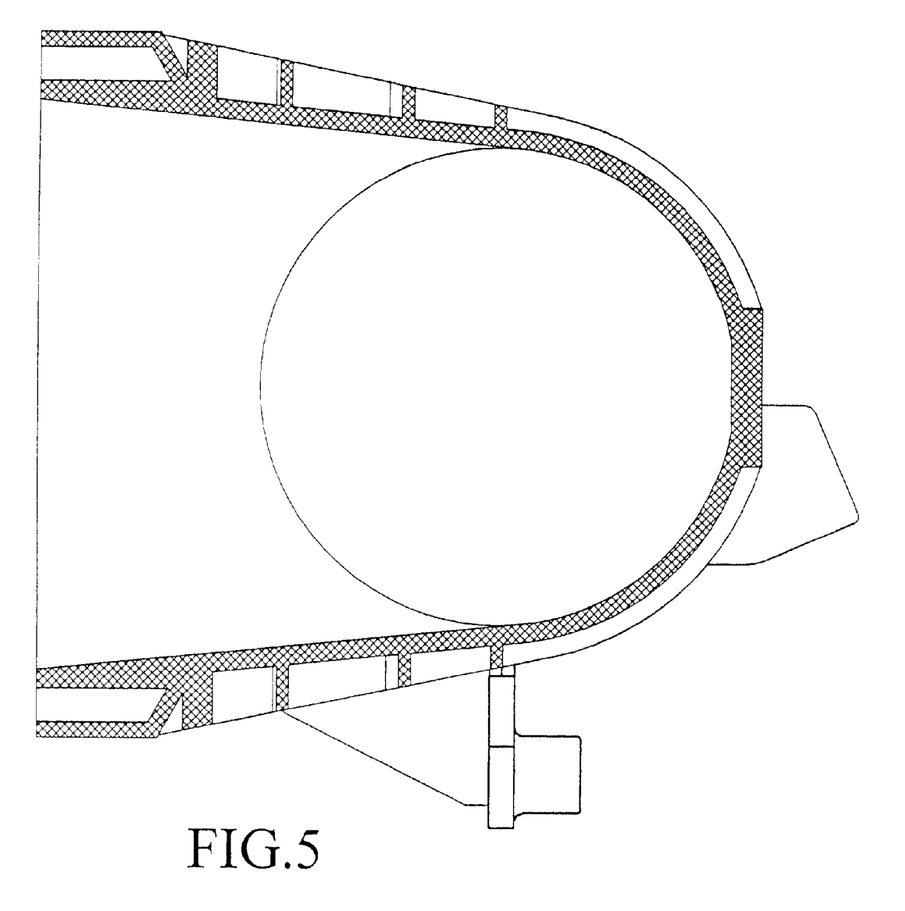
FIG. 5 is a perspective cross-sectional view of the housing.
Figure 6:
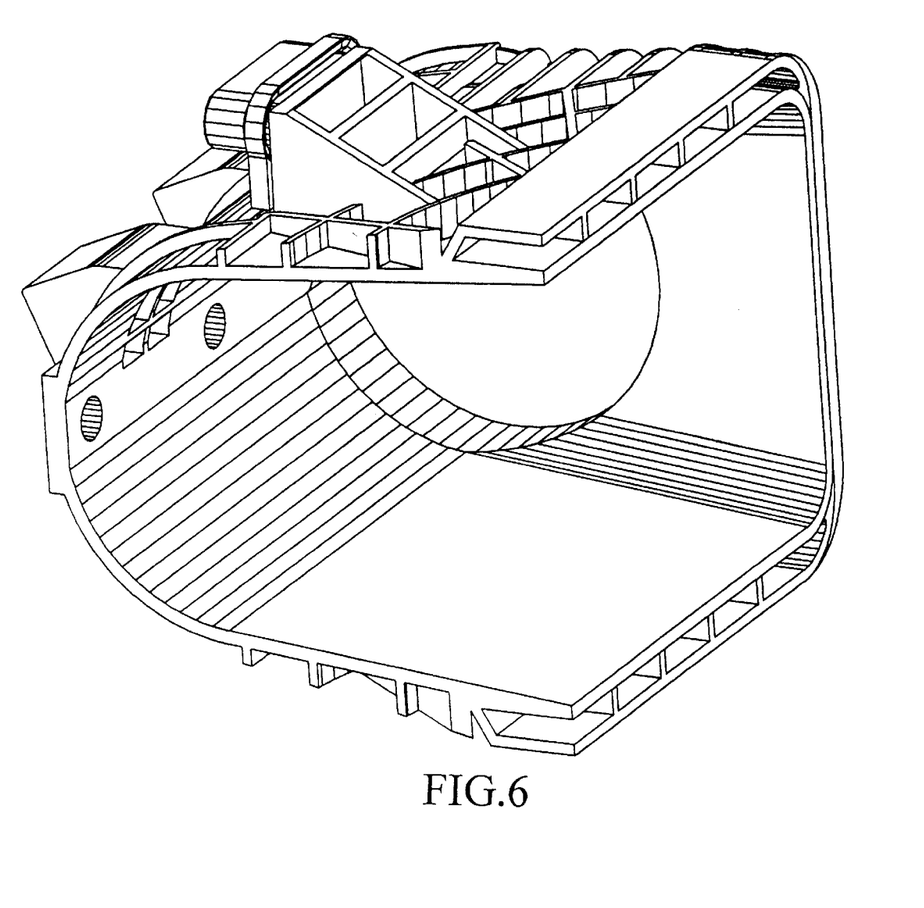
FIG. 6 is a straight cross-sectional view of the housing.

In addition, FIG. 4 shows a variant of the ribbing of the free outer surface of the chamber wall 5, which has a honeycomb structure of the reinforcing ribs 7.

The features described in specification, drawings, abstract, and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

| List of Reference Numbers: | |
|---|---|
| 1 | Housing |
| 2 | Diffusor chamber |
| 3 | Bracket |
| 4 | Front chamber |
| 5 | Chamber wall |
| 5.1 | Chamber cavity |
| 5.2 | Chamber cavity |
| 6 | Transverse reinforcing rib |
| 7 | Reinforcing rib |

What is claimed is:

1. A housing for an inflatable air bag in a motor vehicle, the housing comprising:
   a diffusor section capable of receiving a gas generator;
   a shot channel section including a plurality of sides, one of said sides of said shot channel includes a plurality of substantially parallel walls positioned opposite each other;
   a fastening bracket;
   a plurality of reinforcing ribs having means for counteracting expansion of said shot channel section at an outer contour;
   said diffusor section, said shot channel section, said fastening bracket and said plurality of reinforcing ribs being formed as a one piece part with a plurality of walls.

2. A housing in accordance with claim 1, wherein:
   said one piece part is an injection molded plastic part.

3. A housing in accordance with claim 1, wherein:
   said one piece part is a diecast aluminum part.

4. A housing in accordance with claim 1, wherein:
   said shot channel section has an outlet side and said shot channel section expands uniformly toward said outlet side.

5. A housing in accordance with claim 2, wherein:
   said shot channel section has an outlet side and said shot channel section expands uniformly toward said outlet side in an approximately V-shaped pattern when viewed in cross section.

6. A housing in accordance with claim 3, wherein:
   said shot channel section has an outlet side and said shot channel section expands uniformly toward said outlet side in an approximately V-shaped pattern when viewed in cross section.

7. A housing in accordance with claim 1, wherein:
   said plurality of ribs have a shape and are positioned on said shot channel section for counteracting expansion of said shot channel section;
   an edge of said shot channel section is multiwalled;
   said one piece part is homogeneous;
   said diffusor section is connected to said shot channel section;
   a plurality of said fastening brackets are connected to said diffusor section.

8. The housing in accordance with claim 1, wherein:
   said one of said sides of said shot channel is longer than another of said sides of said shot channel.

9. The housing in accordance with claim 1, wherein:
   two longest of said sides of said shot channel section include said plurality of substantially parallel walls positioned opposite each other.

10. The housing in accordance with claim 1, wherein:
    said shot channel includes a plurality of shot channel ribs extending from one of said substantially parallel walls to another of said substantially parallel walls.

11. The housing in accordance with claim 1, wherein:
    said plurality of ribs expand from said shot channel to said diffusor section.

12. A housing for an inflatable air bag in a motor vehicle, the housing comprising;
    a diffusor section capable of receiving a gas generator;
    a shot channel section with an outlet side, said shot channel section expanding uniformly toward said outlet side in an approximately V-shaped pattern when viewed in cross section;
    a fastening bracket;
    a plurality of reinforcing ribs having means for counteracting expansion of said shot channel section at an outer contour;
    said diffusor section, said shot channel section, said fastening bracket and said plurality of reinforcing ribs being formed as a one piece part with a plurality of walls.

13. A housing for an inflatable air bag in a motor vehicle, the housing comprising;
    a diffusor section capable of receiving a gas generator;
    a shot channel section including a plurality of sides, one of said sides of said shot channel defines a plurality of substantially parallel chamber cavities;
    a fastening bracket;
    a plurality of reinforcing ribs having means for counteracting expansion of said shot channel section at an outer contour;
    said diffusor section, said shot channel section, said fastening bracket and said plurality of reinforcing ribs being formed as a one piece part with a plurality of walls.

14. The housing in accordance with claim 13, wherein:
    said plurality of chamber cavities are separated from each other and from said side of said shot chamber in a sandwich design.

15. A housing for an inflatable air bag in a motor vehicle, the housing comprising;
    a diffusor section capable of receiving a gas generator;
    a shot channel section;
    a fastening bracket;
    a plurality of reinforcing ribs having means for counteracting expansion of said shot channel section at an outer contour, said plurality of ribs expanding from a weakest point of said shot channel;

said diffusor section, said shot channel section, said fastening bracket and said plurality of reinforcing ribs being formed as a one piece part with a plurality of walls.

16. A housing for an inflatable air bag in a motor vehicle, the housing comprising;

a diffusor section capable of receiving a gas generator;

a shot channel section;

a fastening bracket;

a plurality of reinforcing ribs having means for counteracting expansion of said shot channel section at an outer contour, said plurality of ribs expanding from a middle point of said shot channel;

said diffusor section, said shot channel section, said fastening bracket and said plurality of reinforcing ribs being formed as a one piece part with a plurality of walls.

17. A housing for an inflatable air bag in a motor vehicle, the housing comprising;

a diffusor section capable of receiving a gas generator;

a shot channel section;

a fastening bracket;

a plurality of reinforcing ribs having means for counteracting expansion of said shot channel section at an outer contour, said plurality of ribs expanding from said shot channel in one of a V-shape and an arch shape pattern;

said diffusor section, said shot channel section, said fastening bracket and said plurality of reinforcing ribs being formed as a one piece part with a plurality of walls.

* * * * *